United States Patent Office 3,544,627
Patented Dec. 1, 1970

3,544,627
THIOUREA AND ITS LOWER ALKYL SUBSTITUTED DERIVATIVES AS CATALYSTS IN THE PRODUCTION OF CARBOXYLIC ACID CHLORIDES
John Eric Carr, Albert Edward Kaye, and James Harry Wild, Manchester, England, assignors to Imperial Chemical Industries Limited, London, England, a corporation of Great Britain
No Drawing. Filed Sept. 25, 1967, Ser. No. 670,442
Claims priority, application Great Britain, Sept. 29, 1966, 43,624/66
Int. Cl. C07c 51/58
U.S. Cl. 260—544                                    4 Claims

ABSTRACT OF THE DISCLOSURE

A process for the manufacture of a carboxylic acid chloride which comprises reacting a carboxylic acid with phosgene in the presence of a compound containing a thiocarbonamido group.

---

This invention relates to a chemical process and more particularly to a process for the manufacture of carboxylic acid chlorides.

It is already known that carboxylic acid chlorides may be prepared by reacting carboxylic acids with phosgene. In order that the reaction may proceed smoothly to give a high yield of acid chloride it is advantageous to employ a catalyst. It has now been found that the reaction is catalysed by compounds containing the thiocarbonamido group.

Accordingly, the present invention provides a process for the manufacture of a carboxylic acid chloride which comprises reacting a carboxylic acid with phosgene in the presence of a compound containing a thiocarbonamido group.

The catalysts of the present invention are compounds containing at least one group having the formula:

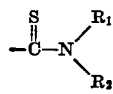

wherein $R_1$ and $R_2$, which may be the same or different, represent hydrogen atoms or alkyl groups or $R_1$ and $R_2$ taken together represent a divalent alkylene radical which may optionally be interrupted by a hetero atom such as oxygen or sulphur.

Examples of compounds which may be used as catalysts in the process of the present invention include thiourea, mono, di, tri and tetra-alkyl substituted thioureas, for example trimethyl thiourea and tetramethyl thiourea and alkyl substituted thiuram mono- and disulphides, for example tetraethyl thiuram sulphide and tetraethyl thiuram disulphide.

Any carboxylic acid may be reacted with phosgene by the process of the present invention. Thus, aliphatic, cycloaliphatic, arylaliphatic or aromatic mono- or polycarboxylic acids may be used. Examples of carboxylic acids which may be used include acetic, propionic, butyric, 2-ethylhexanoic, dodecanoic, acrylic, methacrylic, crotonic, oleic, chloroacetic, oxalic, succinic, adipic, sebacic, benzoic, phenylacetic, cinnamic and terephthalic acids.

The process of the present invention has been found to be particularly suitable for the preparation of acid chlorides from $\alpha$-$\beta$ unsaturated carboxylic acids such as acrylic acid, the derived acryloyl chloride being an important intermediate particularly useful in the preparation of dyestuffs having acrylamido groups. In the reaction of acrylic acid with phosgene some addition of hydrogen chloride takes place at the double bond and the reaction product is usually a mixture of acryloyl chloride and $\beta$-chloropropionyl chloride. When an $\alpha$-$\beta$ unsaturated carboxylic acid is used, it is advantageous to employ a copper salt, for example cuprous chloride or cupric acetate, to inhibit polymerisation.

The process of the present invention may be carried out either continuously or discontinuously. One suitable method is to pass phosgene into a mixture of the carboxylic acid and the catalyst. It is usually found that a suitable amount of thiocarbonamido compound to use is from 0.5% to 6% and preferably from 2.5% to 3.5% by weight based on the weight of carboxylic acid. The phosgene is preferably employed in a slight excess, for example 2–20%, over that stoichiometrically required for reaction with the carboxylic acid. If desired, an inert solvent may be employed for the reaction, for example a hydrocarbon or chlorohydrocarbon. The reaction is exothermic and the temperature can largely be controlled by adjusting the rate of addition of the phosgene. Reaction temperatures in the range of from 70° C. to 100° C. are usually employed in the case of $\alpha$-$\beta$ unsaturated acids but higher temperatures may be employed, in other cases.

The carboxylic acid chloride may be isolated from the reaction mixture in a conventional manner. Thus, after removing the dissolved hydrogen chloride the carboxylic acid chloride may be obtained by distillation.

The invention is illustrated but not limited by the following examples in which all parts are by weight:

EXAMPLE 1

Into 432 parts acrylic acid and 1 part cupric acetate and 10 parts tetramethyl thiourea at 80° C., 695 parts phosgene are passed, maintaining the temperature between 80° and 100° C. by means of reflux condensation. The mixture, distilled under atmospheric conditions via a short column, produces 333 parts acryloyl chloride containing 3% $\beta$-chloropropionyl chloride.

Omission of the tetramethyl thiourea in the above experiment does not permit maintenance of reaction temperature and interaction is not observed.

EXAMPLE 2

Into 122 parts benzoic acid and 3 parts tetramethyl thiourea, 125 parts of phosgene are passed, maintaining the temperature between 95 and 118° C. Distillation of the mixture under reduced pressure via short bead-packed column gives 133 parts benzoyl chloride.

Omission of the tetramethyl thiourea does not permit maintenance of reaction temperature and inter-action is not observed.

EXAMPLE 3

Into 144.5 parts caprylic acid and 7 parts tetramethyl thiourea, 120 parts phosgene are passed maintaining the temperature between 95° and 100° C. The mixture distilled under reduced pressure via a short column gives 158 parts capryloyl chloride.

Omission of the tetramethyl thiourea does not permit maintenance of reaction temperature and inter-action is not observed.

We claim:
1. A process for the manufacture of a carboxylic acid chloride which comprises reacting a mono- or dicarboxylic acid having up to 8 carbon atoms with phosgene in the presence of 0.5% to 6% by weight, based on the weight of said acid, of thiourea or a lower alkyl-substituted derivative thereof.

2. A process according to claim 1 wherein the alkyl-substituted derivative is tetramethyl thiourea.

3. A process according to claim 1 wherein the acid is an $\alpha$-$\beta$ ethylenically unsaturated carboxylic acid.

4. A process according to claim 3 wherein the acid is acrylic acid.

References Cited

UNITED STATES PATENTS 3,149,155  9/1964  Seefelder _____ 260—544
2,848,491  8/1958  Mackenzie _____ 260—544

OTHER REFERENCES

Reid: Organic Chemistry of Bivalent Sulfur, vol. 5, p. 11.

LORRAINE A. WEINBERGER, Primary Examiner

E. J. GLEIMAN, Assistant Examiner